(No Model.)
E. C. COMSTOCK.
EXTENSION TABLE.
No. 540,483. Patented June 4, 1895.
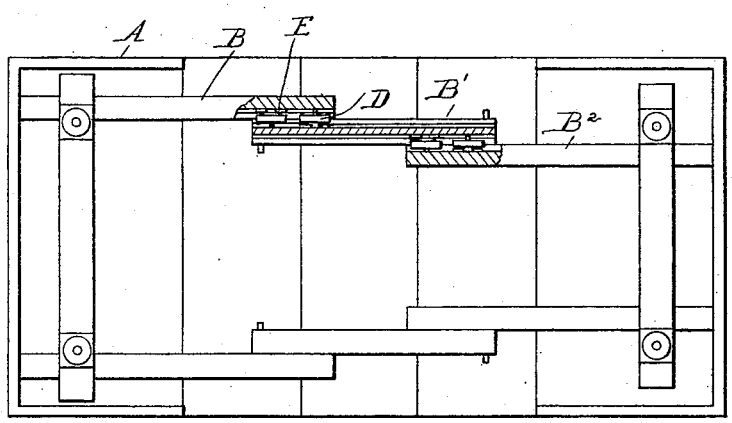
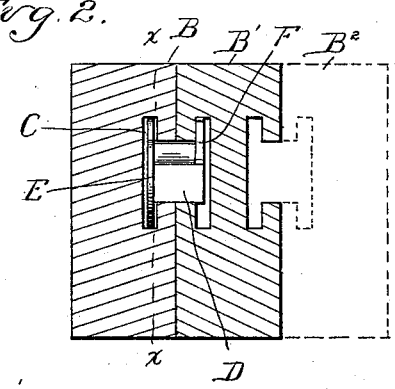
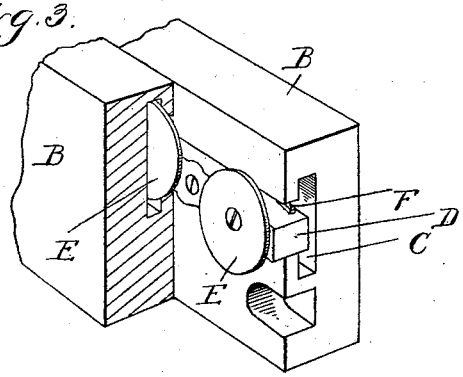
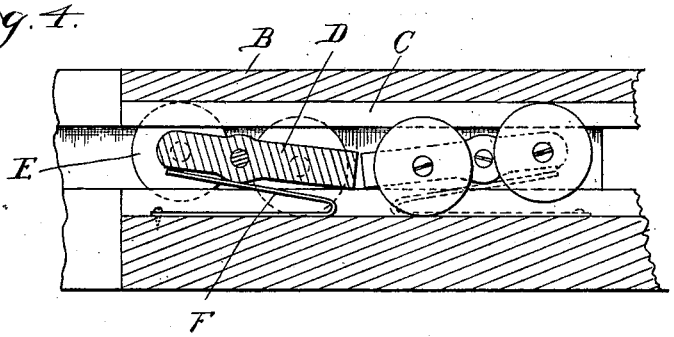
Witnesses
A. L. Hobby
O. F. Bartlett
Inventor
Eben C. Comstock
By Thos. S. Sprague
Attys.
THE NORRIS PETERS CO., PHOTO-LITHO., WASHINGTON, D. C.

UNITED STATES PATENT OFFICE.

EBEN C. COMSTOCK, OF ALMA, MICHIGAN.

EXTENSION-TABLE.

SPECIFICATION forming part of Letters Patent No. 540,483, dated June 4, 1895.

Application filed February 7, 1895. Serial No. 537,599. (No model.)

*To all whom it may concern:*

Be it known that I, EBEN C. COMSTOCK, a citizen of the United States, residing at Alma, in the county of Gratiot and State of Michigan, have invented certain new and useful Improvements in Extension-Tables, of which the following is a specification, reference being had therein to the accompanying drawings.

The invention consists in the construction of a connecting device for the slides of extension tables comprising rollers upon one slide engaging a groove in the other slide, with a spring to hold the rollers in contact with the grooves and thus at all times make a smooth running effect and take up the wear and lost motion.

The invention further consists in the construction, arrangement and combination of the various parts all as more fully hereinafter described.

In the drawings, Figure 1 is a bottom plan view of the table, partly in section, showing my improvement applied thereto. Fig. 2 is a cross-section through the slides. Fig. 3 is a perspective view of the ends of two of the slides as in the act of being engaged with my antifriction connection. Fig. 4 is a longitudinal section on line $x\ x$ in Fig. 2.

A represents an extension table, B B' B² the slides thereof, these slides being provided on their meeting faces with the T shaped slots or grooves C. Pivoted to each slide, preferably at or near the end thereof are the blocks or brackets D, being pivoted centrally of the grooves C. These brackets or blocks are of a width to project into a groove of the adjoining slide; and upon opposite sides of the pivotal points they are provided with the rollers or disk shaped wheels E, adapted to engage in the grooves C.

F is a spring, preferably as shown, secured in the bottom of the groove beneath one end of the bracket and acting with its tension to turn the block or bracket on its pivot, so as to hold one roller against the bottom of the groove and the other roller against the top of the groove of the adjoining slide when the slides are engaged together as shown. This makes an upper and lower bearing for the rollers in the slides, takes up all the lost motion or wear and reduces the friction to a minimum.

While I have shown a specific construction of spring and other parts, I do not desire to be limited to such specific construction as I believe I am the first to provide such a pivot block with rollers on opposite sides of the pivot and a spring applied for the purpose described.

What I claim as my invention is—

1. In an extension table, the combination of the slides, a block pivoted to one slide, rollers or wheels on the block on opposite sides of the pivot thereof engaging in a groove in the adjoining slide and a spring to hold the rollers in the top and bottom of the groove respectively.

2. In an extension table, the combination of the grooved slides, blocks pivoted to each slide, rollers or wheels on the blocks on opposite ides of the pivot thereof engaging in the grooves in the adjoining slide, and springs acting to hold the rollers in top and bottom of the grooves respectively.

3. In an extension table, the combination of the slides having grooves in their contiguous faces, the blocks D centrally pivoted and located at the ends of the slides in the grooves, projecting into the grooves of the adjoining slides, the springs F at one end of the blocks and disks or rollers at opposite ends of the blocks pressed respectively against the top and bottom of the groove.

In testimony whereof I affix my signature in presence of two witnesses.

EBEN C. COMSTOCK.

Witnesses:
 NETTA FISHER,
 FRANK E. POWERS.